United States Patent [19]

Marvin

[11] Patent Number: 5,305,599
[45] Date of Patent: Apr. 26, 1994

[54] PRESSURE-RATIO CONTROL OF GAS TURBINE ENGINE

[75] Inventor: Ira E. Marvin, Russell Springs, Ky.

[73] Assignee: General Electric Company, Cincinnati, Ohio

[21] Appl. No.: 683,162

[22] Filed: Apr. 10, 1991

[51] Int. Cl.⁵ .............................................. F02K 3/02
[52] U.S. Cl. .................................... 60/226.3; 60/242
[58] Field of Search ...................... 60/226.3, 235, 236, 60/242, 262

[56] References Cited

U.S. PATENT DOCUMENTS

| | | |
|---|---|---|
| 2,858,671 | 11/1958 | Fox . |
| 2,873,576 | 2/1959 | Lombard . |
| 3,316,717 | 5/1967 | Castle et al. . |
| 3,449,914 | 6/1969 | Brown . |
| 3,739,580 | 6/1973 | Blandl . |
| 3,841,091 | 10/1974 | Sargisson et al. . |
| 3,852,956 | 12/1974 | Martin . |
| 3,879,941 | 3/1975 | Sargisson . |
| 3,938,328 | 2/1976 | Klees . |
| 4,010,608 | 3/1977 | Simmons . |
| 4,043,121 | 8/1977 | Thomas et al. . |
| 4,052,845 | 10/1977 | Tumavicus . |
| 4,064,692 | 12/1977 | Johnson et al. . |
| 4,080,785 | 3/1978 | Koff et al. . |
| 4,128,995 | 12/1978 | Toot . |
| 4,139,887 | 2/1979 | Levesque ............................. 60/242 |
| 4,159,625 | 7/1979 | Kerr ..................................... 60/236 |
| 4,175,384 | 11/1979 | Wagenknecht et al. . |
| 4,292,802 | 10/1981 | Snow . |
| 4,376,375 | 3/1983 | Boudigues . |
| 4,380,148 | 4/1983 | Burrage et al. ................ 60/39.281 |
| 4,409,788 | 10/1983 | Nash et al. . |
| 4,414,807 | 11/1983 | Kerr ..................................... 60/236 |
| 4,432,201 | 2/1984 | Hawes . |
| 4,442,667 | 4/1984 | MacIsaac . |
| 4,467,600 | 8/1984 | Peikert ................................. 60/242 |
| 4,507,915 | 4/1985 | Evans .............................. 60/39.281 |
| 4,813,229 | 3/1989 | Simmons . |
| 4,959,955 | 10/1990 | Patterson et al. .................... 60/242 |

Primary Examiner—Louis J. Casaregola
Attorney, Agent, or Firm—Bernard E. Shay; Jerome C. Squillaro

[57] ABSTRACT

Control of a gas turbine engine, suitable for powering an aircraft, is accomplished by varying outlet nozzle cross section and/or a mixing of bypass air with exhaust gas at an inlet to the nozzle. The engine includes a core engine having a combustion chamber and high and low pressure turbines followed by an exhaust plenum. High and low pressure compressors driven by the turbine assembly direct air into the combustion chamber and into a bypass duct. The bypass duct extends from an outlet of the low pressure compressor. Pressure of fluid (air or exhaust) is measured at an inlet to the high pressure compressor, in the bypass duct, and in the exhaust plenum. Ratios of the pressure of the duct pressure or of the pressure at the inlet of the high-pressure compressor, to the plenum pressure are employed in a feedback loop for control of nozzle size, and also of mixing valve position in an alternate embodiment of the invention. The feedback loop includes computation of a desired pressure ratio based on desired power and inlet temperature to the low-pressure compressor.

12 Claims, 5 Drawing Sheets

PRESSURE-RATIO CONTROL OF GAS TURBINE ENGINE

BACKGROUND OF THE INVENTION

This invention relates to gas turbine engines having bypass airflow with a variable exhaust nozzle suitable for aircraft use and, more particularly, to the control of engine operation based on ratios of pressure at different locations within the engine.

One class of turbine engine for aircraft use which is of particular interest herein is known as the "variable cycle" engine. The variable cycle is a family of hybrid gas turbine engines which can operate with the high specific thrust characteristics of a low bypass-ratio turbofan or turbojet engine at supersonic speeds, yet also exhibit the lower specific thrust, low noise and low fuel consumption characteristics of a high bypass-ratio turbofan engine. The need for such variable cycle engines has risen because of the need for an efficient multimission aircraft.

There has been a need to establish the best control mode for a variable cycle engine. The control mode should obtain the most accurate control or regulation of those factors which affect engine operability, life and performance. These factors are net thrust, high-pressure turbine inlet temperature, fan stall margin, booster-stage stall margin, maximum rotor speeds, and cooling-flow pressure ratio. This regulation should be maintained with minimal effects from errors of control sensors, variations in engine quality, and engine deterioration from wear or service. The foregoing characteristics are most critical at the maximum dry power and at augmented thrust levels above the maximum dry power.

Experience has shown that the principle factor in achieving the foregoing control regulation objective is the selection of a set of measured engine variables that are the most effective and mutually compatible. These control parameters may include a variable engine geometry such as nozzle throat cross section, or stator position, by way of example, as well as a pressure ratio, a rotor speed, or a rotor speed "corrected" by a measured temperature. An engine may have several control modes (sets of control variables) with each mode being used for a different power range or flight operating region, such as altitude and Mach number ranges.

A major advancement in engine-cycle design, or the addition of new engine elements of variable geometry, usually requires a reconsideration of the control modes relative to those used in earlier or predecessor engines. This presents a problem in that the control modes used for one family of engines need to be changed, at least in part, to meet the special needs of the later improved engine. The previously defined modes are not necessarily fully satisfactory in the regulating of net thrust and other parameters, mentioned above, for the later engine. Other control modes and parameters which have been practiced in the construction and use of aircraft turbine engines have not met all of the foregoing goals. Examples of such construction and practice which may not be satisfactory for meeting the foregoing goals are the following: (A) Turbine exhaust gas temperature or computed turbine inlet temperature controls may cause excessive thrust loss when considering the effects of component deterioration. (B) Optical pyrometers for turbine metal temperatures may present problems in terms of cost and reliability. (C) Engine pressure ratio (turbine discharge pressure divided by fan-inlet pressure) has the disadvantage of requiring the measurement of engine-inlet pressure in a highly distorted pressure field subject to serious acquisition errors, as may be caused by a poor sample of inlet pressure. Also, icing of pressure probes or orifices, as well as of pressure lines should be prevented. Presently available technology has not met adequately the foregoing goals.

SUMMARY OF THE INVENTION

The aforementioned problem is overcome and other advantages are provided by a control system for a gas turbine engine, the engine with the control system being suitable for powering aircraft. The engine is constructed, generally, with a core engine having a turbine assembly with a combustion chamber and an exhaust plenum disposed at the opposite end of the turbine assembly. A compressor assembly is driven by the turbine assembly for directing air into the combustion chamber. The compressor assembly includes a lowspeed compressor and a high-speed compressor which are serially connected along an airflow path by a connecting conduit which extends from an outlet of the low-pressure compressor to an inlet of the high-pressure compressor. A bypass duct extends from the outlet of the low-pressure compressor to the exhaust plenum to serve as a conduit for air along a path which bypasses the core engine. A mixing valve is located at the junction of the bypass duct with the exhaust plenum to permit selection of a desired amount of bypass air to be entrained with the exhaust gas to provide a composite gas which exits the turbine engine via a nozzle. The nozzle is located at an aft end of the exhaust plenum, and is provided with a variable cross section at the throat of the nozzle. Adjustment of the cross section of the nozzle throat is useful in regulating the exhaust pressure, turbine temperature and gross thrust.

In accordance with the invention, pressure is measured in the connecting conduit of the compressor assembly, at the inlet to the high-pressure compressor, and also in the bypass duct to provide the pressures of the gasses at these two locations. Also, the pressure of the turbine exhaust gas is measured in the plenum. These three values of pressure are employed in the control of the mixing valve and the nozzle cross section to attain desired operating characteristics of the turbine engine. This is accomplished by forming the ratio of pressure of the air in either one of the conduits to the pressure of the exhaust gas in the plenum. These pressure ratios can be sensed and formed in either of two ways: (1) as $P_2/P_1$ or (2) as $(P_2-P_1)/P_1$, the latter expression being in terms of differential pressure. Algebraically, these pressure ratios can be expressed as $P_2/P_1 = (P_2-P_1)/P_1 + 1$ or $(P_2-P_1)/P_1 = P_2/P_1 - 1$, the latter expressions being in the form of a pressure ratio plus a constant bias.

Pressure ratios are controlled to predetermined "demand schedules", and these schedules can be designed with or without a constant adder. The choice is one for the control designer based on the type of pressure sensors available; this invention being operative independently of the choices for pressure sensors for either of the foregoing two types of ratios, namely, the ratio of two pressures or the ratio of a differential pressure and a pressure.

At low to moderate levels of plenum pressure ratios (and the corresponding turbine gas temperatures) it is advantageous to control the jet nozzle throat area by a state-of-the-art type of area scheduling method using as scheduling variables the engine inlet temperature, power lever angle, and perhaps the aircraft Mach. No. ($M_0$). However as the un-augmented thrust and the turbine inlet temperature approach the maximum rated levels, it becomes necessary to use an engine feedback signal which provides for more accurate control of thrust and turbine temperature. The principal form of the invention provides also schedules of desired pressure ratio (plenum and bypass duct as described above) as functions of engine-inlet temperature and power level demand. This pressure ratio schedule and the area schedule are designed in conjunction so that the pressure ratio schedule takes over from (or overrides) the nozzle area schedule at the higher levels of the unaugmented thrust range. This type of arrangement, where there is a preplanned transfer of control means, is commonly used in large aircraft engines.

The pressure ratio based on measured values of pressure may be referred to as the actual pressure ratio, or feedback pressure ratio, so as to be distinguishable from the desired pressure ratio provided by the schedule. A difference between the desired and the actual pressure ratio produces an error signal for driving the feedback loop. In the case of control of the nozzle area, actual pressure ratio employing either the pressure in the bypass duct, or the pressure at the inlet at the high-pressure compressor, may be employed, as will be disclosed in the description of a first and a second embodiment of the invention. In a third embodiment of the invention, two different pressure ratio control loops are deployed to independently control the nozzle area and the mixing valve. In both cases there are "position" or "area" controls which share duties with pressure ratio controls on an either/or basis. (i.e. either pressure ratio control or position/area control). In this third alternative, plenum and bypass duct pressures are used in the nozzle control, and plenum and compressor inlet pressures are used for the mixing valve control (as trimming provisions added to scheduled mixer valve position/area). In all three of the alternatives, provisions are made to prevent an excessive differential pressure between bypass duct and plenum.

In accordance with a feature of the invention, it has been discovered that the use of a feedback loop employing an actual pressure ratio utilizing the foregoing measured values of pressure provides a high degree of thrust control accuracy which is minimally affected by the usual sensor errors, variations in engine quality, and engine deterioration due to wear or service. This excellent performance is also obtained without the disadvantages accruing to the placement of pressure probes ahead of the fan in an environment of high distortion, water ingestion and icing. The features of the invention are present both in the system by which control of the engine is obtained, and in the methodology of the control. Also, it is noted that while a primary use of the invention is in the control of engines during aircraft flight including take-off and landing, the principles of the invention may be practiced also for other uses of a gas turbine engine.

BRIEF DESCRIPTION OF THE DRAWING

The aforementioned aspects and other features of the invention are explained in the following description, taken in connection with the accompanying drawing wherein.

DETAILED DESCRIPTION

Figure 1:
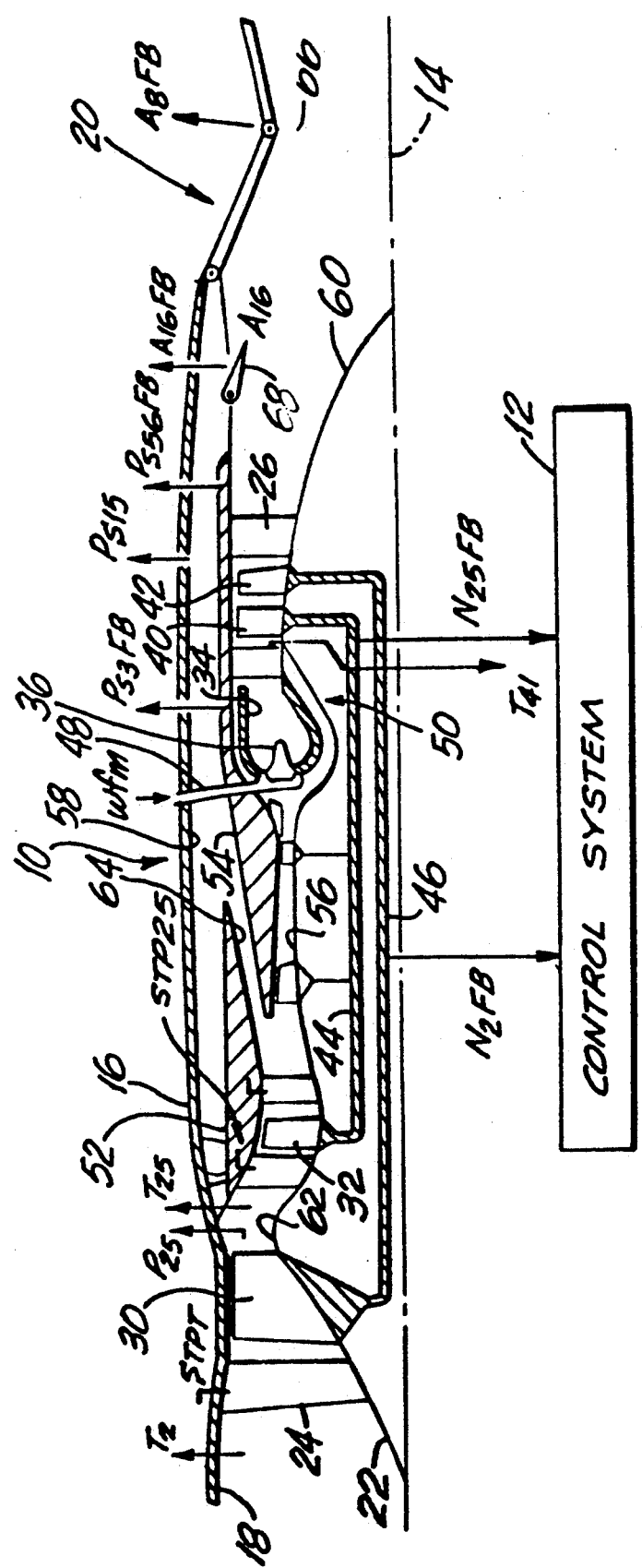
FIG. 1 is a partial diagrammatic view of a gas turbine engine controlled in accordance with the invention, the view showing locations of various engine parameters useful for control of the engine operation.

FIG. 1 shows a diagrammatic view of a portion of a gas turbine engine 10 suitable for use in powering aircraft, the engine 10 including a control system 12 constructed in accordance with the invention. The engine 10 has symmetry about as longitudinal axis 14 and, accordingly, the drawing has been simplified by showing only one-half of the engine 10 disposed on one side of the axis 14. The engine 10 comprises an outer casing 16 with an air inlet 18 at the upstream end of the engine 10 and an exhaust nozzle 20 at the downstream end of the engine 10. While the principles of the invention are applicable to engines of various configurations, the construction of the engine 10 is provided as an example for the practice of the invention.

The engine 10 comprises a central body 22 centrally positioned relative to the casing 16 by struts, such as the struts 24 and 26, to define airflow passages within the engine 10. The engine 10 includes a low-pressure compressor 30 and a high-pressure compressor 32 disposed downstream of the low pressure compressor 30. A combustion chamber 34, this being the primary combustor in the case of augmentation (not shown), is located downstream of the high-pressure compressor 32, and includes an array of burners 36 for combusting fuel to generate a high-velocity exhaust gas flow which passes through a forward turbine 40 and an aft turbine 42. Exhaust gases exiting the aft turbine 42 pass through the nozzle 20 to produce thrust for propelling a vehicle, typically an aircraft.

A rotor of the high pressure compressor 32 is connected by an outer shaft 44, of annular cross section, to a rotor of the forward turbine 40 whereby the forward turbine 40 rotates the rotor of the high-pressure compressor 32 including the rear block 56 of the compressor 32. The rotor of the low-pressure compressor 30 is connected by an inner shaft 46, disposed within and coaxial to the shaft 44, to a rotor of the aft turbine 42 whereby the aft turbine 42 rotates the rotor of the low-pressure compressor 30. A fuel inlet 48 conducts fuel to the burners 36. The combustion chamber 34 in combination with high pressure compressor and the forward and the aft turbines constitutes a core engine 50. An airfoil 52 of annular configuration about the axis 14 is disposed between the casing 16 and the central body 22, and extends downstream between the casing 16 and a forward portion of a housing 54 of the core engine 50. An inner surface of the airfoil 52 in conjunction with an outer surface of the central body 22 defines a main air passage through the high-pressure compressor 32 for directing air into the rear block 56 of the high-pressure compressor 32. An outer surface of the air foil 52, in conjunction with the casing 16, forms a main bypass duct 58 which extends from the low-pressure compressor 30 to an exhaust plenum 60 on the downstream side of the aft turbine 42. A conduit 62 conducts air from the low-pressure compressor 30 to the high pressure compressor 32 and 56, the conduit 62 branching into the main bypass duct 58 for distributing a portion of the inlet air to the main bypass duct 58. As air in the duct 58 bypasses the core engine 50, it is joined with further bypass air provided by a secondary bypass duct 64 formed between the inner surface of the airfoil 52, at a downstream end of the airfoil 52, and the forward end of the housing 54.

In operation, all of the engines incoming air enters the engine inlet 18 and passes through a front compressor (fan) 30 which is driven by the aft turbine 42. The air leaving the front compressor 30 divides radially into two streams; the inner stream enters the second compressor 32 while the outer stream of the divided airflow enters the bypass duct. The compressed air leaving the second compressor 32 divides again radially and the inner stream from this second division enters the rear block 56 of the high pressure compressor while the outer of these streams passes into the bypass duct 58. Air from the high pressure compressor enters the primary combustor 34 where it is mixed with the main fuel flow ($W_{fm}$) and burned. Gases from the primary combustor 34 drive the HP (high pressure) turbine 40 and the LP (low pressure) turbine 42. The rotor speeds are designated in FIG. 1 as $N_{2FB}$ for the LP rotor and $N_{25FB}$ for the HP rotor. RPM sensors are used in the control system 12 to supply the controls with information on these rotor speeds. The combustor 36 exit (HP turbine inlet) gas temperature is designated on FIG. 1 as $T_{41}$.

The exhaust nozzle 20 has a throat 66 with variable cross-sectional area. A mixing valve 68 is disposed on the housing 54 between the main bypass duct 58 and the exhaust plenum 60 for mixing a desired amount of bypass air with exhaust gases, the bypass air becoming entrained with the exhaust gases to pass through the throat 66 of the nozzle 20 as a high-speed jet. Conventional means are provided for obtaining various measurements of shaft speeds, fluid pressures and temperatures of air and exhaust in the various conduits of the engine 10, as well as a position of the valve 68, and the area of the throat 66. These measurements are employed by the control system 12. Also, conventional means are employed for the deflection of the valve 68, adjustment of the throat area of the exhaust nozzle 20, and adjustment of the fuel flow at the fuel inlet 48 to the burner 36.

Several choices of pressure and temperature are sensed at various locations within the engine 10, and provided to the control system 12, as are indicated in FIG. 1. In the practice of the invention there are three values of pressure of particular interest. These three values of pressure are (1) the pressure in the exhaust plenum 60, this pressure being designated $P_{S56FB}$ in the drawing; (2) the pressure in the downstream end of the main bypass duct 58, this pressure being designated $P_{S15}$; and (3) the pressure in the conduit 62 of the compressor assembly 28, this pressure being designated $P_{25}$ in the drawing. As will be explained in the ensuing description of the control system 12, an important feature of the invention is the use of ratios of pressure employing the foregoing three values of pressure for the control of the position of the mixing valve 68, and for control of the cross-sectional area of the throat 66 of the exhaust nozzle 20.

Temperature measured by the pyrometer and computed $T_{41}$ refer to turbine temperatures. The pyrometer is a device which "views" optically the electromagnetic radiations from rotating turbine blades - radiations originating due to the heat of the blades (radiations either infrared or visible spectrum). A photoelectric transducer (sensor) generates an electrical output that increases with the surface temperature of turbine blades (which may also be air-cooled blades using internally circulated cooling air).

Some of the terms employed herein are explained as follows. $M_0$ is a commonly accepted symbol for aircraft air speed - commonly used by aircraft industry engineers.

The symbol "S" is used with its Laplace meaning; however, it is used also with another meaning. In controls system logic diagrams it is common to use an "S+" or an "S−" enclosed in a box with two (or more) inputs and one output. The "S+" means to select the greater or greatest of the input signals and pass it on. The "S−" means to select the lessor or least of the input signals and pass it on.

The term "NF" as used herein is shorthand for fan speed (RPM), and fan speed relates to the first compressor (in the airflow path sequence) which is usually called a fan in jet engine parlance.

$$\sqrt{\theta_2}$$

is a commonly used designation for the square root of the engine inlet (fan inlet)) "total" temperature (in degrees Rankine) divided by the square root of 518.67

$$\sqrt{\theta_2} = (T_2/518.67)^{1/2}$$

"Total" temperature means stagnation temperature, and wherein all the kinetic energy is recovered as sensible heat in the air.

$P_{T15}$ is the total pressure at station 15 and $P_{T56}$ is the total pressure at station 56. Station 15 is in the bypass duct at an engine axial station (fore and aft direction) corresponding to the turbine rear strut 26 in FIG. 1. Station 56 is in the engine exhaust plenum behind strut 26. Both stations 55 and 56 are less than a foot behind strut 26. Total pressure means that pressure which results if all kinetic energy is recovered isentropically.

In the ensuing description, various pressure ratios will be described such as the ratio $P_{S15}/P_{S56}$. It is understood that the reciprocal of the pressure ratio may also be employed for control of the engine. Furthermore, in view of the close proximity of the stations 55 and 56, good control of the engine can be attained also in the situation wherein the pressure at station 55 is employed instead of the pressure at station 56. Also, if desired, $P_{T56}$ may be employed in place of $P_{S56}$.

It is noted also that nozzle area may be set by a "position" control (physical area or actuator stroke) at low engine power, but at high power the position control is superseded by the pressure ratio control means which gives superior thrust accuracy control.

Figure 2:
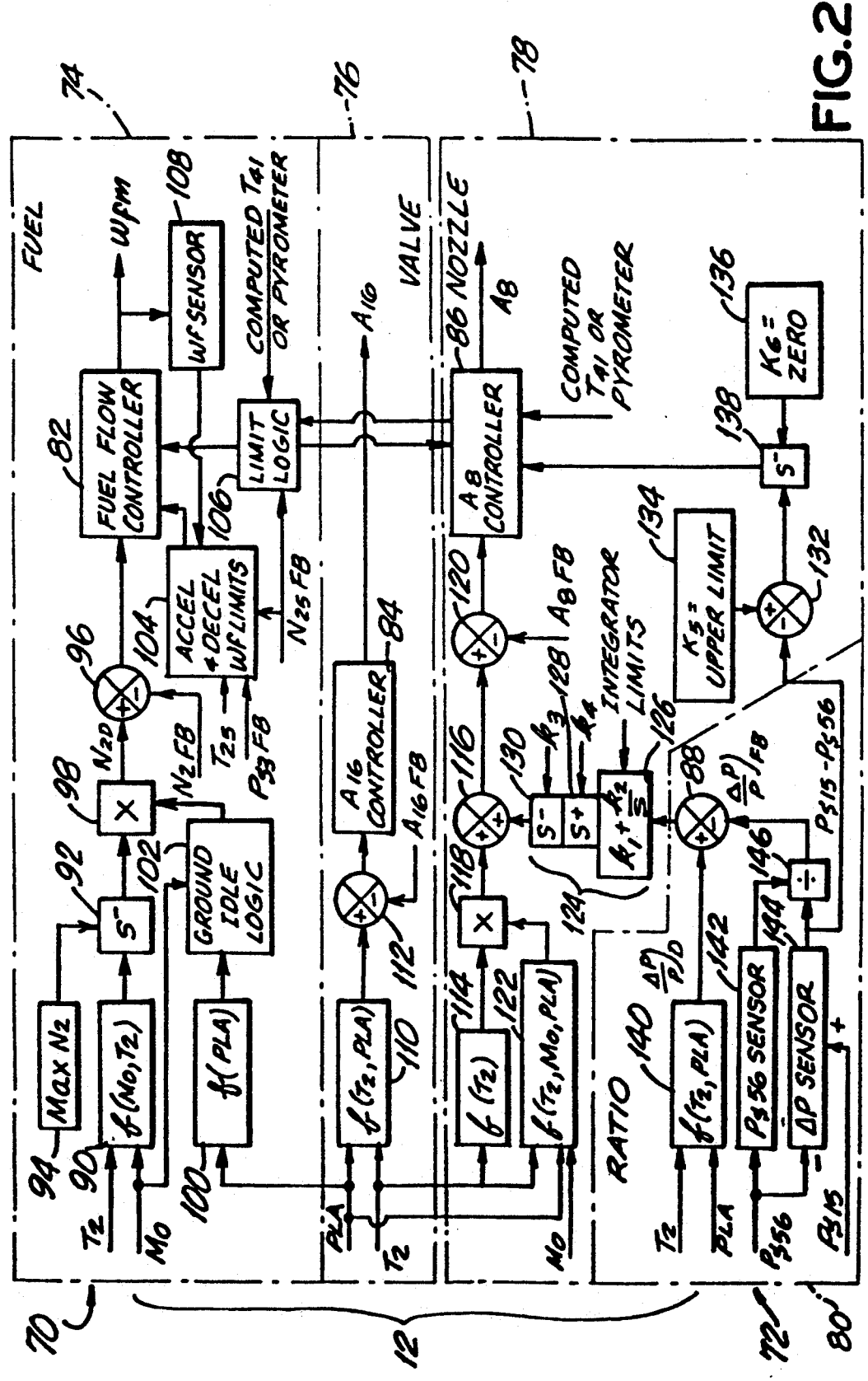
FIG. 2 is a block diagram of a control system of the gas turbine engine of FIG. 1 in accordance with a first embodiment of the invention.

FIG. 2 shows a block diagram of the control system 12 of FIG. 1 in accordance with a first embodiment of the invention. To facilitate the description of FIG. 2, as well as further embodiments of the control system disclosed in FIGS. 3 and 4, it is convenient to divide the system 12 into a first part 70 and a second part 72. The first part 70 is divided further into a fuel control section 74 and a valve control section 76. The second part 72 is divided further into a nozzle control section 78 and a ratio control section 80. Briefly, the fuel control section 74 includes a controller 82 connected to the fuel inlet 48 for regulating the flow of fuel into the burners 36 (FIG. 1). The fuel flow is designated in the drawing by the legend $W_{fm}$. The valve control section 76 includes a controller 84 connected to the valve 68 for positioning the valve 68. In the drawing, the valve 68 is designated further by the legend $A_{16}$ which represents the area of the valve. The nozzle control section 78 includes a controller 86 connected to an actuator which is connected to nozzle 20 for regulating the cross-sectional area of the throat 66. In the drawing, the throat 66 is identified further by the legend $A_8$ which represents the area of the throat. The ratio control section 80 includes a summer 88 which outputs a loop error signal based on the difference between a desired pressure ratio and an actual pressure ratio determined by signals fed back (indicated by the legend FB) from measurement sensors of the engine 10 to the control system 12. The error signal outputted by the summer 88 is used in the control of the nozzle throat 66. Additional temperatures, pressures and RPM rotor shaft rotation rates are indicated in both FIGS. 1 and FIG. 2, as well as in FIGS. 3, 4 and 5. The locations of the arrows for respective ones of the parameters in FIG. 1 identify the respective locations within the engine 10 wherein measurements of temperature, pressure and shaft rotation, as well as position of the mixing valve 68 and configuration of the nozzle 20, are located. This facilitates a reading of the diagrams of FIGS. 2-5 in that the meaning of the various signals can be ascertained by inspection of FIG. 1.

In FIG. 2, the fuel control section 74 comprises a schedule 90, a signal selector 92 coupled to an output terminal of the schedule 90, a limit-signal source 94, a summer 96 having an output terminal connected to an input terminal of the controller 82, a multiplier 98 connecting an output terminal of the selector 92 with an input terminal of the summer 96, a schedule 100, a logic unit 102 connected between an output terminal of the schedule 100 and an input terminal of the multiplier 98, a schedule 104 having an output terminal connected to an input terminal of the controller 82, a logic unit 106 having an output terminal connected to an input terminal of the controller 82, and a sensor 108 connected between an output port of the controller 82 and an input terminal of the schedule 104 for sensing a rate of fuel flow applied to the fuel inlet 48 (FIG. 1) to report back the rate of fuel flow to the schedule 104. Each of the schedules 90, 100, and 104 are constructed in a well-known fashion, and may include a function generator or look-up table or read-only memory, by way of example, to provide an output signal related in a prescribed fashion to one or more input signals which, by way of further example, may serve as addresses to the read-only memory.

Two input signals are applied to the schedule 90, namely, the input temperature signal $T_2$ at the air inlet 18, and the signal $M_0$. The schedule 104 has four inputs, namely, the aforementioned input from the sensor 108, a signal designating the temperature $T_{25}$ in the conduit 62 of the compressor assembly, a feedback (FB) signal $P_{S3}$ reporting the pressure of air applied to the combustion chamber 34, and a feedback (FB) signal $N_{25}$ reporting the rate of rotation of the shaft 44 from the forward turbine. One input signal is applied to the schedule 100, namely, the power demand signal, PLA, which is inputted by a person operating the engine 10, typically the pilot of an aircraft. To facilitate description of the engine 10, it will be presumed that the engine 10 is being employed to power an aircraft, it being understood that the engine 10 could be employed also to power some other type of vehicle such as a boat on the ocean or a land vehicle. The limit-signal source 94 provides a signal designating a maximum rotational rate $N_2$ of the inner shaft 46 from the aft turbine 42. The actual rotational rate $N_{2FB}$ of the shaft 46 is supplied to an input terminal of the summer 96. The inlet temperature $T_{41}$ at the forward turbine 40 (or pyrometer) is applied to an input terminal of the logic unit 106 and the rotational speed $N_{25FB}$ of the outer shaft 44 is applied to another input terminal of the logic unit 106. The signal $M_0$ is applied also to an input terminal of the logic unit 102.

In operation, the fuel control section 74 provides for a regulating of the corrected rotational rate of the low-pressure compressor 30, or fan, by control of the fuel delivery rate to the burners 36. The schedule 90 outputs a value of shaft speed for the inner shaft 46 which powers the low-pressure compressor 30, or fan, the output signal of the schedule 90 being applied to an input terminal of the signal selector 92. An output signal of the limit-signal source 94 is applied also to an input terminal of the selector 92. The selector 92 selects the smaller of the two input signals, either the the signal of the schedule 90 or the signal of the source 94, and outputs the smaller signal to the multiplier 98. The signal selector 92 is a well-known device which may comprise a comparator (not shown) for comparing the magnitudes of the two input signals, and a switch (not shown) operated by the comparator for coupling the smaller of the two input signals to the output terminal of the signal selector 92.

The schedule 100 and ground idle logic 102 provides a multiplier to the output of schedule 90 or the limit value 94 whichever is selected by selector 92. This multiplier reduces the fan RPM from its maximum power value as set by the functional elements 90, 92, and 94. This allows for adjusting fan RPM in accordance with the needs for engine thrust. The ground idle logic 102 merely resets the lower limit on the multiplier range so that "ground idle" thrust can be lower than "flight idle" thrust. The summer 96 subtracts the actual shaft speed from the demand shaft speed to supply an error signal, or difference signal, to the fuel controller 82 to alter the amount of fuel flow as may be required to provide the correct shaft speed for the shaft 46.

The valve control section 76 comprises a schedule 110 and a summer 112 connecting an output terminal of the schedule 110 with an input terminal of the controller 84. The schedule 110 receives, as input signals, the power demand signal and the inlet temperature to output a desired setting or position of the valve 68 (FIG. 1). A signal $A_{16FB}$ designating the actual position of the valve 68 is applied to a second input terminal of the summer 112. The summer 112 forms the difference between the desired and actual valve positions to output an error signal, or difference signal, to the controller 84 for activating the controller 84 to drive the valve 68 to the desired position. Thereby, the controller 84 regulates the flow area of the valve 68 for connecting the main bypass duct 58 to the turbine exhaust plenum 60.

As mentioned above, the construction of the engine 10 (FIG. 1) comprises conventional pressure sensors and temperature sensors for providing the foregoing values of pressure and temperature at various locations within the engine 10. In order to simplify the drawing of FIG. 1, the tail ends of the various arrows bearing the temperature and pressure designations are understood to designate the respective sensor locations within the engine.

The nozzle control section 78 comprises a schedule 114, a summer 116, a multiplier 118 connecting an output terminal of the schedule 114 with an input terminal of the summer 116, a summer 120 connecting an output terminal of the summer 116 with an input terminal of the controller 86, a schedule 122 having an output terminal connected to an input terminal of the multiplier 118, and a proportional-plus-integral gain assembly 124 interconnecting an output terminal of the summer 88 with an input terminal of the summer 116. The assembly 124 comprises a gain computer 126 providing gain and limits function including the central elements of proportional-plus-integral control, along with output signal selectors 128 and 130 which provide fixed limits ($K_4$ and $K_3$) on the overall gain from output of summer 88 to the input of summer 116. The nozzle control section 78 further comprises a summer 132 connected to the ratio control section 80, a source 134 of limit signal connected to an input terminal of the summer 132, a source 136 of a zero reference signal, and a signal selector 138 which connects an output terminal of the summer 132 with an input terminal of the controller 86. The selector 138 is constructed in the same fashion as the selector 92, and outputs the smaller of its two input signals, either the output signal of the summer 132 or the zero signal of the source 136.

In operation, the schedule 114 is responsive to the engine inlet temperature for providing a function which serves as a first factor for the multiplier 118. The schedule 122 is responsive to the power-demand signal, the engine inlet temperature and the signal M0 for outputting a function which serves as a second factor for the multiplier 118. The multiplier 118 forms the product of the two factors, the product being a desired area ($A_8$) for the throat 66 of the exhaust nozzle 20. The desired nozzle area is applied to the summer 116. Also applied to the summer 116 is a signal outputted by the assembly 124 based on the ratio 88 from section 80, signals outputted by the ratio control section 80 being a feature of the invention as will be described hereinafter. The signal outputted by the summer 88 is multiplied by the proportional-plus-integral gain assembly 124 prior to being applied to the summer 116. The gain assembly 124 establishes the dynamic response of a feedback loop of the second part 72 of the control system 12.

The correction signal outputted by the summer 88 is derived from exhaust-plenum pressure signal $P_{S56}$, main-bypass pressure signal $P_{S15}$, engine inlet temperature signal $T_2$, and the power-demand signal PLA. The summer 116 sums the desired nozzle area of the multiplier 118 with the correction term from the gain assembly 124 to provide a corrected value of the nozzle area which is compared with the actual nozzle area $A_{8FB}$ at the summer 120. The difference between the desired and actual values of the nozzle area is represented by a difference signal outputted by the summer 120 to the controller 86 for adjusting the nozzle area to the desired value. A computed $T_{41}$ signal or pyrometer signal which serves as a temperature limit is also applied to the controller 86. In addition, the controller 86 is coupled to the logic unit 106 to provide further limitation of the fuel flow in the fuel control section 74, as well as to limit changes in the nozzle area based on speeds of the shafts 44 and 46.

The ratio control section 80 comprises a schedule 140, a pressure sensor 142, a differential pressure sensor 144, and a divider 146. In operation, the schedule 140 employs the engine inlet temperature and the power-demand signal to output a function of these two signals which is a desired value of a ratio of pressures. In the ratio, the differential pressure of the pressure ratio is the difference between the exhaust-plenum pressure and the bypass-duct pressure; and the pressure is the exhaust-plenum pressure. The sensor 142 is physically connected by a pneumatic tube to the plenum 60 for sensing the plenum pressure. The sensor 144 is connected by pneumatic sensing tubes to the exhaust plenum 60 and the main bypass duct 58 for sensing the differential pressure between the plenum and the bypass duct. The outputted value of the differential pressure is shown in FIG. 2 as $P_{S15}-P_{S56}$. The differential pressure is divided by the plenum pressure at the divider 146 to provide a feedback pressure ratio. The summer 88 subtracts the feedback pressure ratio from the desired pressure ratio to provide the aforementioned correction signal which is applied via the gain assembly 124 to the summer 116 of the nozzle control section 78. The differential pressure signal is also applied to an input terminal of the summer 132 which subtracts the differential pressure signal from an upper limit reference value of the source 134, as disclosed hereinabove.

In operation, the schedules 114 and 122 in cooperation with the multiplier 118 establish a base or nominal value for the nozzle cross-sectional area. The nominal value of the area is adjusted in the summer 116 according to the demand of the pressure ratio control of the ratio control section 80 so that, in effect, there is a closed-loop control of the nozzle area by the pressure ratio except where fixed bounds on $A_8$ schedule trimming are imposed by the constants $K_3$ and $K_4$ in the gain assembly 124. By design Choice for the limits $K_3$, $K_4$, schedule 140, schedule 114 and schedule 122 the controls designer arranges to use open-loop $A_8$ control at low engine power and closed-loop pressure ratio control at high power. This arrangement provides best engine performance at high power and improved control stability at low power.

The demand value for the nozzle area, as modified by the ratio error signal, is attained at the summer 116, and is compared with the measured value of nozzle area at the following summer 120. The error between demand and feedback is used by the nozzle-area controller 86 to alter the nozzle area toward the demand value. The area controller 86 provides for override of the area error signal as required in order to aid in preventing overspeed of the fan, overtemperature of $T_{41}$ or the pyrometer measured temperature, and over-pressure in the differential pressure $P_{S15}-P_{S56}$.

The second part 72 of the control system 12 also provides for a differential-pressure over-pressure limit in the control of the nozzle area. This is true even in the case wherein the engine 10 includes an augmenter (not shown) which may be located between the aft turbine 42 and the nozzle 20 (or within the main bypass duct 58). To prevent excessive crushing force (in event of augmentor flame-out) on the aft portion of the outer casing 16 in the vicinity of the valve 68, the differential pressure signal outputted by the sensor 144 is compared at the summer 132 with the limit value of the source 134. The resulting difference is selected by the selector 138 whenever this difference is less than zero, the difference signal being sent to the $A_8$ controller 86. This negative signal is used to override the other error signal from the summer 120 so as to close the nozzle 20, and thereby to reduce the differential pressure. The foregoing principles in the operation of the invention apply also to an augmented engine wherein the controller 86 provides the requisite function and logic for coordinating augmented operation with nozzle-area control.

A feature of the invention is the use of the pressure ratio of differential pressure divided by plenum pressure as one of the parameters in a set of control parameters that includes fan-corrected speed and scheduled nozzle area wherein the control parameters are scheduled from engine inlet temperature and power demand signal. A further feature of the invention is the use of the differential pressure signal to provide a limit on the inwardly directed pressure on the aft section of the casing 16. The invention provides advantages of superior thrust control with little loss in thrust due to engine deterioration and/or production variations in engine quality. Also, the invention provides for superior control of stall margins for both fan and cooling-flow pressure heads of gas turbine engines. Also, the margin requirements for the high-pressure turbine inlet temperature $T_{41}$ and for rotation speed $N_{25}$ are also reduced near to the theoretical minimum requirements as set by engine quality variations and in-service deterioration. Practice of the invention does not require a measurement of engine inlet pressure, this providing advantages of reduced cost and weight, and increased reliability for the installed engine. There are gains in the operable flight envelope relative to the alternative engine pressure-control mode, this providing more stall margin at extreme altitude. Furthermore, the utilization of differential pressure in a pressure ratio control can improve the accuracy of pressure ratio control in those applications where the differential pressure is small relative to the absolute pressure. In addition, the use of a differential pressure sensor provides for the most accurate method for limiting differential crushing pressure between bypass duct and plenum.

Figure 3:
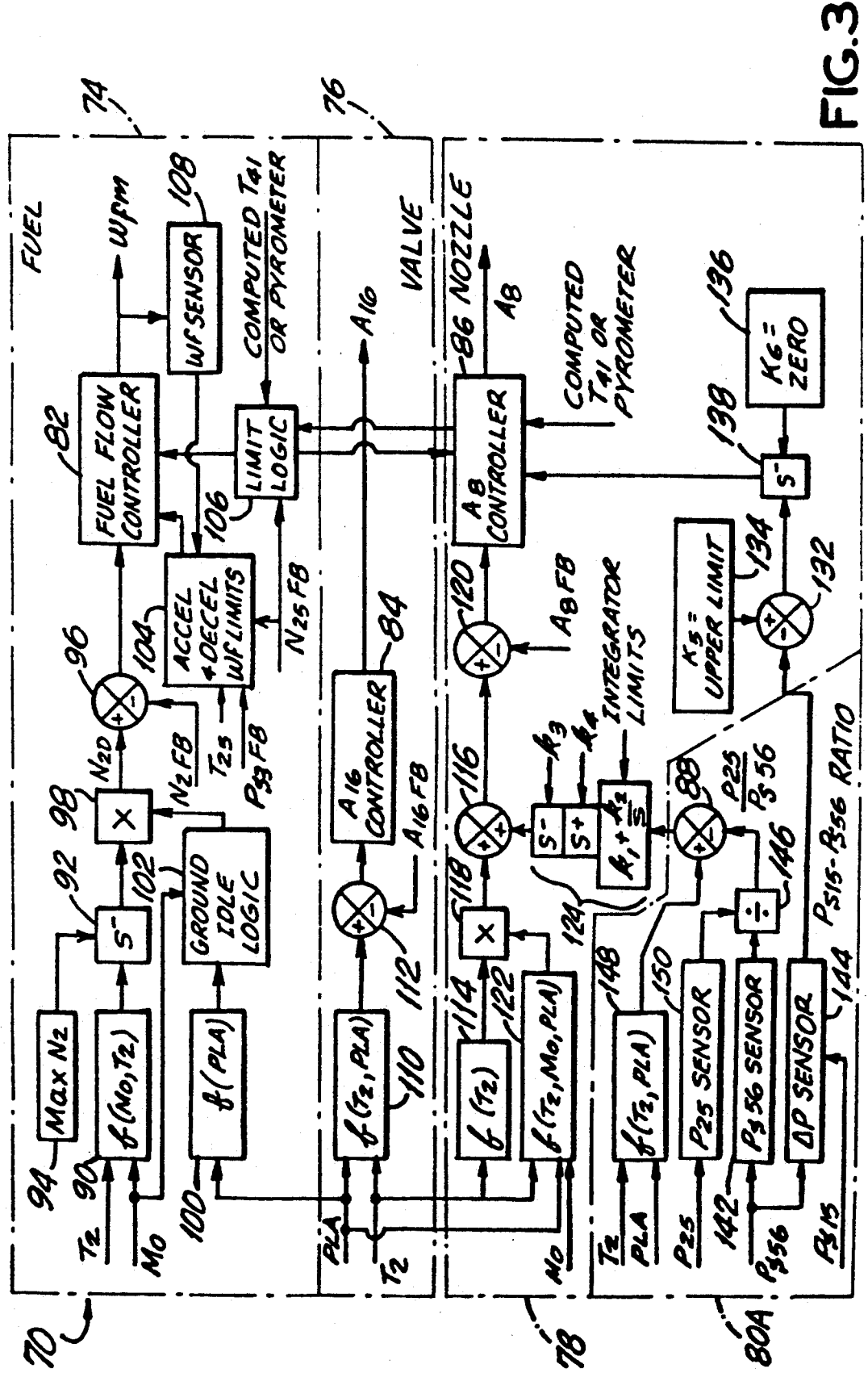
FIG. 3 is a block diagram of a control system of the gas turbine engine of FIG. 1 in accordance with a second embodiment of the invention.

FIG. 3 shows an alternative embodiment (second embodiment) of the control system 12 wherein the fuel control section 74, the valve control section 76 and the nozzle control section 78 are retained as portrayed in FIG. 2, but wherein the ratio control section 80 of FIG. 2 is replaced in FIG. 3 with a ratio control section 80A. The ratio control section 80A provides essentially the same function as does the ratio control section 80 of FIG. 2; however, the ratio control section 80A operates with a different pressure ratio than does the ratio control section 80.

In FIG. 3, the ratio control section 80A comprises a schedule 148, and a pressure sensor 150 in addition to the previously-described pressure sensor 142, differential pressure sensor 144, divider 146, and summer 88. In FIG. 3, the schedule 148 is responsive to engine inlet temperature and to power-demand signal to output a desired pressure ratio. The sensor 150 is connected by a pneumatic tube to $P_{25}$ probes located in conduit 62 as shown in FIG. 1 and outputs a signal representing pressure $P_{25}$. The sensors 142 and 144 are responsive to the same pressures and operate in the same fashion as has been disclosed above with reference to FIG. 2. The divider 146 outputs a ratio of the compressor conduit pressure divided by the exhaust-plenum pressure $P_{S56}$. The desired pressure ratio outputted by the schedule 148 and the measured pressure ratio outputted by the divider 146 are applied to the summer 88 which takes the difference of the two pressure ratios, and applies the difference via the gain assembly 124 to the summer 116 in the same fashion as has been described previously with reference to FIG. 2. Also, the differential pressure is coupled from the sensor 144 to the summer 132 as has been described above with reference to FIG. 2. Thus, the two ratio sections 80 and 80A operate in essentially the same fashion except that the ratio section 80A employs the ratio of the pressure of the compressor conduit divided by the pressure of the exhaust plenum in place of the pressure ratio of the ratio section 80 which employs the ratio of the differential pressure divided by the plenum pressure wherein the differential pressure is the difference between the pressure of the main bypass duct minus the pressure of the exhaust plenum.

Figure 4:
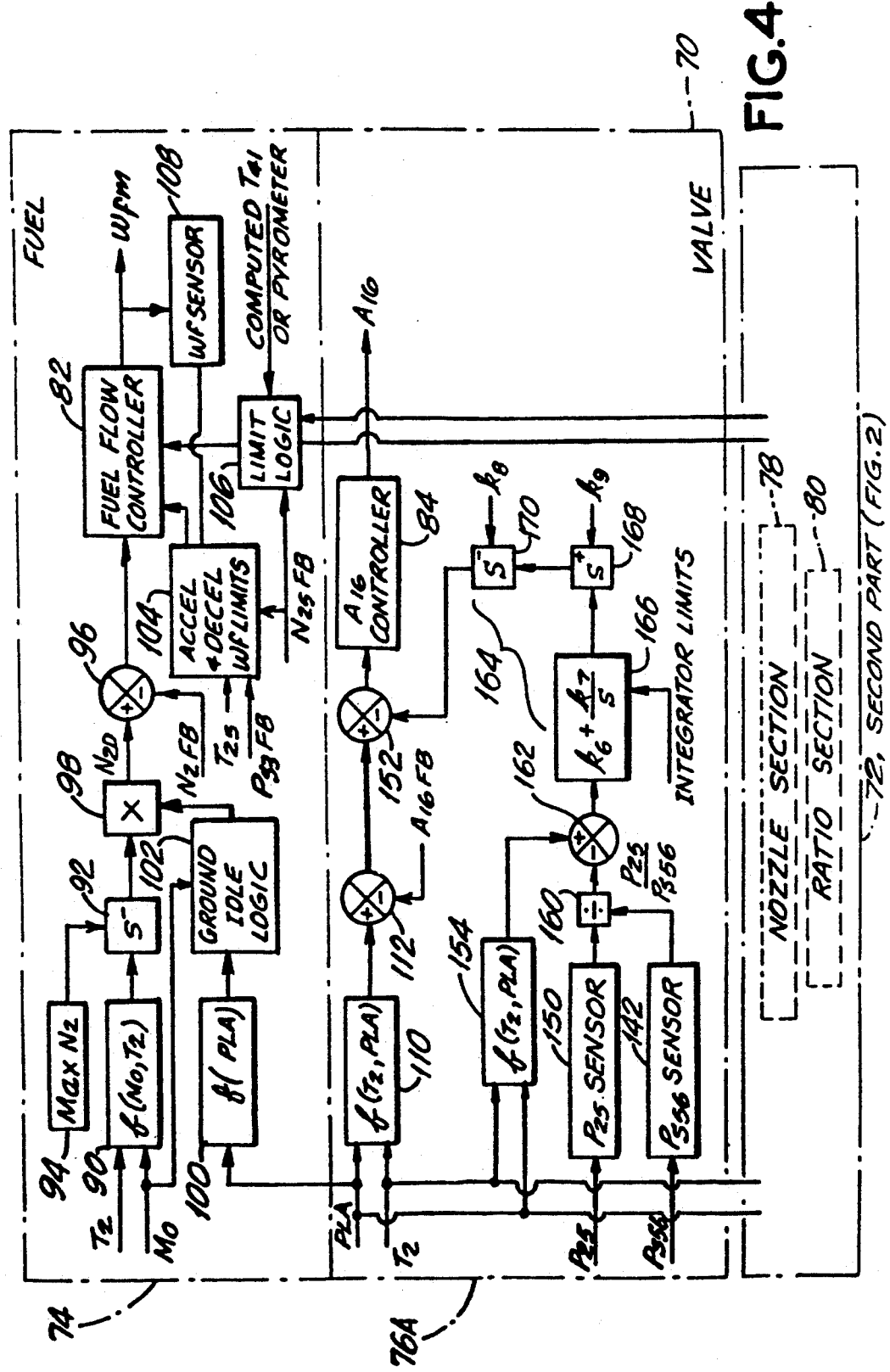
FIG. 4 is a block diagram of a control system of the gas turbine engine of FIG. 1 in accordance with a third embodiment of the invention.

FIG. 4 presents a further embodiment (third embodiment) of the control system 12. In this embodiment, the second part 72 of the control system is retained as described in FIG. 2, but the first part 70 is modified. In the first part 70, the fuel control section 74 is retained as disclosed in FIG. 2, but the valve control section 76 of FIG. 2 is replaced in FIG. 4 with a valve control section 76A. The valve control section 76A employs the schedule 110, the summer 112, and the controller 84 as disclosed above with reference to FIG. 2, and comprises a further summer 152 interconnecting an output terminal of the summer 112 with an input terminal of the controller 84. The controller 84 is employed to operate the mixing valve 68 to control the area A16 for air flow through the valve 68.

The valve control section 76A is operative with the $P_{S56}$ sensor 142 (shown in FIGS. 2 and 3) and the $P_{25}$ sensor 150 (shown in FIG. 3), and further comprises a schedule 154, a divider 160, a summer 162, and a proportional-plus-integral gain assembly 164. The valve control section 76A also employs the sensor 142 for sensing the plenum pressure $P_{S56}$. The assembly 164 functions in the same fashion as the the assembly 124 (FIG. 2) and comprises an integrator 166 followed by two signal selectors 168 and 170 which correspond respectively to the elements 126, 128, and 130 of the assembly 124. The assembly 164 differs from the assembly 124 in that the coefficients $K_6$–$K_9$ may differ from the corresponding constants $K_1$–$K_4$.

In operation, the divider 160 forms the ratio of the plenum pressure divided into the compressor conduit pressure, the output pressure ratio from the divider 160 being applied to an input terminal of the summer 162. The schedule 154 is responsive to the engine inlet temperature and to the power-command signal to provide a desired pressure ratio which is applied to an input terminal of the summer 162. The pressure ratio of the divider 160 is based on measured pressures and, therefore, represents the actual, or feedback, pressure ratio. The summer 162 forms a difference between the desired and the actual pressure ratios to form a loop error signal. The loop error signal is coupled from the summer 162 via the gain assembly 164 to the summer 152. This provides for a feedback connection in the control of the mixing valve 68 by a sensing of pressures which are affected by the position of the mixing valve 68. The gain assembly 164 establishes the dynamic response of the feedback loop. It is noted that the error signal applied by the gain assembly 164 to the summer 152 is in addition to a desired position of the mixing valve 68 provided by the schedule 110 and an actual measured value of the valve position as fed back by the signal $A_{16FB}$ which has been disclosed above with reference to FIG. 2. Thus, there is a double feedback loop involving a feedback position and two feedback pressure signals.

The additional closed loop control of the mixing valve 68 by the pressure ratio of compressor conduit pressure to exhaust plenum pressure is employed in the embodiment of FIG. 4 at high engine power settings. Thus, the operating mode definition at maximum dry power becomes, for the third embodiment $$N_f/\sqrt{\theta_2}, (P_{s15} - P_{s56})/P_{s56}, P_{25}/P_{s56}$$

In the same descriptive framework, the parameters for the first embodiment are $$N_f/\sqrt{\theta_2}, (P_{s15} - P_{s56})/P_{s56}, A_{16}$$

and the parameters for the second embodiment are $$N_f/\sqrt{\theta_2}, (P_{25} - P_{s56})/P_{s56}, A_{16}$$

By way of further embodiments of the invention, it is noted that the principles of the invention can also be applied by the use of the pressure $P_{T15}$ in place of the pressure $P_{S15}$ and/or $P_{T56}$ in place of the $P_{S56}$.

Figure 5:
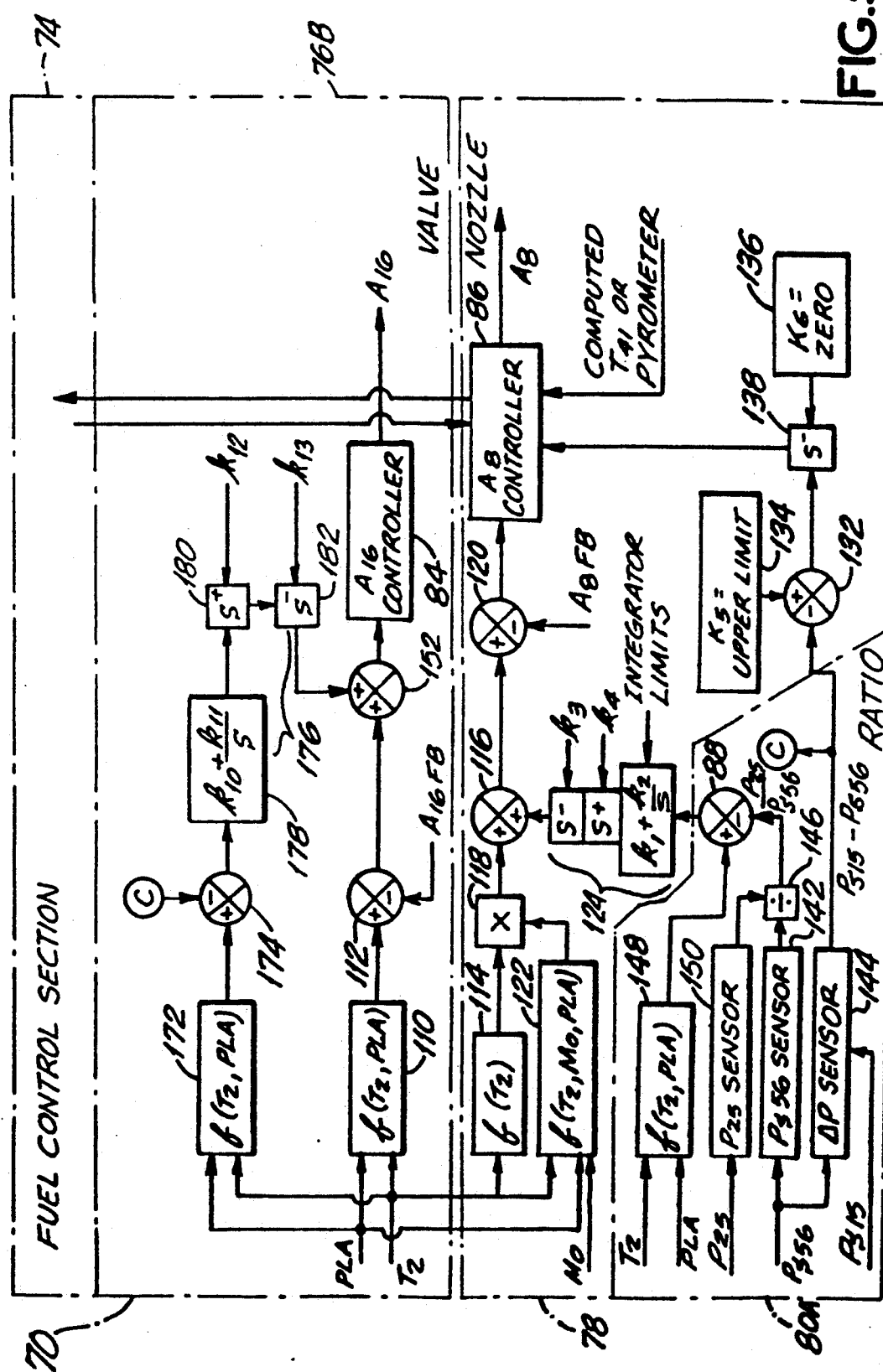
FIG. 5 is a block diagram of a control system of the gas turbine engine of FIG. 1 in accordance with a fourth embodiment of the invention.

FIG. 5 presents a fourth embodiment of the control system 12. In this embodiment, the parts 78 and 80A of FIG. are retained as described for the second embodiment of FIG. 3. Furthermore, the fuel control system 74 used in all the embodiments is retained. The parameter grouping which describes this fourth embodiment is $$\frac{N_F}{\sqrt{\theta_2}}, \frac{P_{25}}{P_{s56}}, (P_{s15} - P_{s56})$$

The differences between the fourth embodiment and the second embodiment appear in a valve section 76B which is an alternative embodiment of the valve section 76 for control of the $A_{16}$ valve.

The section 76B includes the open-loop area-control schedule 110 which set the desired flow area $A_{16}$ when the engine is at low power settings and the differential pressure is larger than necessary to satisfy the cooling-flow needs. Air traveling down the bypass duct is much cooler than many turbine and exhaust structures and is therefore supplied for cooling these parts of the engine in proportion to the difference pressure $(P_{S15}-P_{S56})$. At high engine power, more cooling flow is needed. The additional cooling flow is attained by the closing the mixing valve 68 (having the area $A_{16}$ shown in FIG. 1) sufficiently to drive up the cooling flow differential-pressure to the level wherein adequate cooling flow is attained.

The section 76B further comprises a schedule 172, a summer 174 connected to an output terminal of the schedule 172, and a proportional-plus-integral gain assembly 176 interconnecting an output terminal of the summer 174 with an input terminal of the summer 152.

The gain assembly 176 comprises a gain computer 178 providing gain and limits function including the central elements of proportional-plus-integral control, along with output signal selectors 180 and 182 which provide fixed limits ($K_{12}$ and $K_{13}$) on the overall gain from output of summer 174 to the input of summer 152. Also, the output signal of the differential pressure sensor 144 in the ratio section 80A is coupled via terminal C to an input terminal of the summer 174.

In operation, the additional cooling is provided by use of the schedule 172 to demand a differential pressure appropriate to the power lever angle of the mixing valve 68 and the engine inlet temperature. The demand differential pressure is compared with the sensed differential pressure in the summer 174, and the error signal at the output of the summer 174 is processed by using the proportional-plus-integral gain computer 178. Limits are placed on the upper and lower bounds of the controller reset signal by use of the selectors 182 and 180, respectively, in order to provide stability and speed of response desired from the closed loop differential-pressure feedback system. The amplified and limited differential-pressure error signal is then summed with the $A_{16FB}$ feedback signal and supplied to the $A_{16}$ controller 84.

By way of further embodiments to the invention, it is noted that the foregoing four embodiments are operative with various ratios of pressure, and that the indicated schedules are established to operate with the disclosed pressure ratios. However, if desired, the inverse or reciprocal of a pressure ratio, such as $P_{S56}/P_{25}$ instead of $P_{25}/P_{S56}$, may be employed upon making a compensating change in the schedules. Therefore, in the ensuing claims, a pressure ratio is understood to include either a disclosed pressure or its reciprocal.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A control for a gas turbine engine, the gas turbine engine comprising:
   a core engine having a turbine means, a combustion chamber, and an exhaust plenum disposed at an end of said turbine means opposite said combustion chamber, said exhaust plenum receiving exhaust gas expelled from a combustion chamber via the turbine means;
   compressor means driven by said turbine means for directing air into said combustion chamber, said compressor means including a low-pressure compressor and a high-pressure compressor;
   a bypass duct extending from an outlet of said low-pressure compressor to said exhaust plenum; and
   wherein said control comprises:
   entraining means connected to a downstream end of said exhaust plenum for entraining bypass air of said bypass duct with gas expelled from said combustion chamber, the entraining means being adjustable for varying a flow of the bypass air, said bypass duct serving as a first conduit of air past said core engine, there being a second conduit of air in said compressor means for conducting air from the outlet of said low-pressure compressor to an inlet of said highpressure compressor; and adjustment means responsive to a ratio of pressure in one of said conduits to pressure in said exhaust plenum for adjusting said entraining means for controlling flows of the bypass air and exhaust gas.

2. A control according to claim 1 wherein said entraining means comprises an engine exhaust nozzle thrust generating means including a jet exhaust nozzle of variable throat area connecting the exhaust plenum with outside atmosphere, said adjustment means adjusting said nozzle throat area.

3. A control according to claim 2 wherein said pressure ratio is the ratio of pressure in said bypass duct to the pressure in said exhaust plenum.

4. A control according to claim 2 further comprising means for forming said pressure ratio wherein said pressure ratio is given by the difference in pressure of said one duct minus the pressure in said plenum, said difference in pressure being divided by said pressure in said plenum.

5. A control according to claim 4 wherein said adjustment means is configured as a closed-loop feedback control of the size of nozzle, said feedback loop being responsive to input signals of desired power and inlet temperature of said low-pressure compressor; and further comprising
 a schedule responsive to said input signals for generating a desired value of said pressure ratio.

6. A control according to claim 2 further comprising means for forming said pressure ratio wherein said pressure ratio is the ratio of pressure in said further conduit of said compressor means to the pressure in said exhaust plenum.

7. A control according to claim 6 wherein said adjustment means is configured as a closed-loop feedback control of the size of nozzle, said feedback, loop being responsive to input signals of desired power and inlet temperature of said low-pressure compressor; and further comprising
 a schedule responsive to said input signals for generating a desired value of said pressure ratio.

8. A control according to claim 1 wherein said entraining means comprises a valve located at a junction of said bypass duct with said exhaust plenum for restricting flow of the bypass air, said adjustment means adjusting a position of said valve for mixing a desired amount of the bypass air with the exhaust gas.

9. A control according to claim 1 wherein said entraining means comprises an engine exhaust nozzle of variable cross section, and a valve located at a junction of said bypass duct with said exhaust plenum; and wherein
 a further pressure ratio is employed, said adjustment means adjusting the size of said nozzle cross section in response to said first-mentioned pressure ratio, and said adjustment means adjusting a position of said valve in response to said further pressure ratio for restricting a flow of the bypass air into said exhaust plenum; and
 said first-mentioned pressure ratio is the ratio of a differential pressure divided by the pressure in said plenum wherein said differential pressure is the difference in pressure of said bypass duct minus the pressure in said plenum, and said further pressure ratio is the ratio of the pressure in said second conduit of said compressor means to the pressure in said exhaust plenum.

10. A control according to claim 9 comprising:
 means for forming each of said pressure ratios, said adjustment means, including closed-loop feedback controls of the size of said nozzle and of the position of said valve, said feedback controls being responsive to input signals of desired power and inlet temperature of said low-pressure compressor; and
 schedule means responsive to said input signals for generating desired values of said pressure ratios.

11. A control according to claim 1 wherein said entraining means comprises an engine exhaust nozzle of variable cross section, and a valve located at a junction of said bypass duct with said exhaust plenum; and wherein
 said adjustment means adjusts the size of said nozzle cross section in response to said pressure ratio, said adjustment means adjusting a position of said valve in response to a pressure difference for restricting a flow of the bypass air into said exhaust plenum; and
 said pressure ratio is the ratio of pressure in said second conduit of said compressor means divided by the pressure in said exhaust plenum, and said pressure difference is the difference of the pressure in said bypass duct minus pressure in said exhaust plenum.

12. A control according to claim 11 wherein said adjustment means comprises
 ratio means responsive to the pressures of said second conduit and said exhaust plenum for forming said pressure ratio; and
 difference means responsive to the pressures of said bypass duct and said exhaust plenum for forming said pressure difference.

* * * * *